Figure 1:
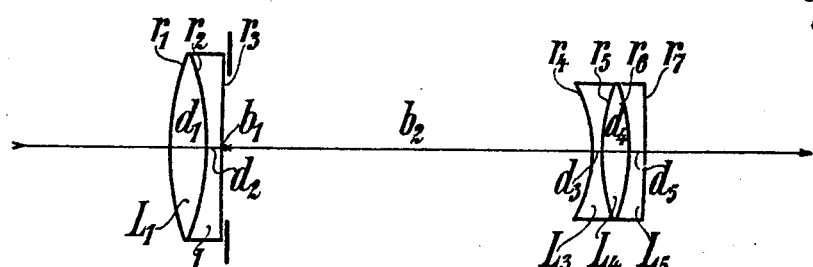
Figure 2:
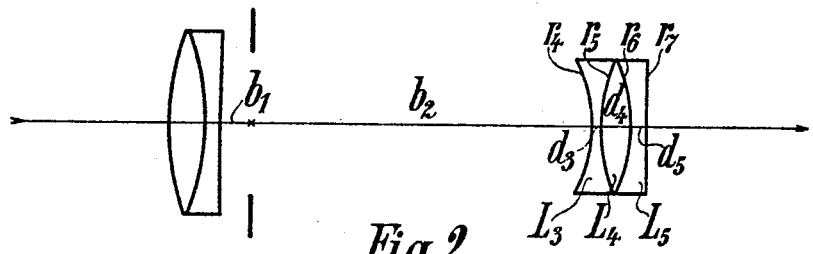

E. WANDERSLEB.
TELEOBJECTIVE.
APPLICATION FILED AUG. 13, 1909.

943,105.

Patented Dec. 14, 1909.

Witnesses:

Inventor:

UNITED STATES PATENT OFFICE.

ERNST WANDERSLEB, OF JENA, GERMANY, ASSIGNOR TO THE FIRM OF CARL ZEISS, OF JENA, GERMANY.

TELEOBJECTIVE.

943,105.   Specification of Letters Patent.   Patented Dec. 14, 1909.

Application filed August 13, 1909. Serial No. 512,755.

*To all whom it may concern:*

Be it known that I, ERNST WANDERSLEB, a citizen of the German Empire, residing at Carl-Zeiss strasse, Jena, in the Grand Duchy of Saxe-Weimar, Germany, have invented a new and useful Teleobjective, of which the following is a specification.

The object of the invention is the further improvement of the tele-objective according to Patent 873,898. The latter tele-objective is chromatically and spherically corrected.

It consists of a positive cemented double lens in front and a negative cemented double lens behind. The focal length of the positive double lens exceeds that of the negative one. Each of both double lenses is chromatically corrected, but has a spherical aberration of the order of magnitude and of the sign of a simple lens which has the same focal length positive and negative respectively. While thus consisting of four lenses only, the tele-objective according to Patent 873,898 has re-attained for the first time the advantage of the Dallmeyer eight lenses tele-objective (British specification 21933/91), viz., that there exists a great useful aperture as well as a great useful field of view. As to the correction of the spherical and the astigmatic aberration as well as the distortion, the more simple new objective has even more than reached the elder one composed of twice as many parts.

By the present invention, while the number of the components of the tele-objective according to Patent 873,898 is increased from four to five, a considerable chromatic correction of the oblique pencils is added to the favorable hitherto corrections of the single aberrations. Correction of astigmatism is almost equally attained for the colors, which are optically and actinically most effective, and the differences of distortion for different colors are considerably restrained. The practical result is a still better distinctness of the image toward the margin.

The increase by one component occurs in the negative element, and this in such a manner that it is henceforth composed of both a front and a hinder dispersive lens and a median collective lens.

In the drawing: Figures 1 to 4 are each an axial section through a tele-objective constructed according to the invention.

The constructive data of these four examples are given in the following tables. In all of the examples the positive element from the constructive example of the Patent 873,898 is retained unaltered. In the fourth example the spherical correction for an axial pencil is not as yet attained, but this lack may be easily removed by slightly "bending" the positive element, by which procedure the oblique pencils are practically uninfluenced.

EXAMPLE FIG. 1.

Focal length of the total system 998.1.

| Radii. | Thicknesses and Distances. |
|---|---|
| $r_1 = +\ 156.8$ | $d_1 =\ 20.6$ |
| $r_2 = -\ 142.8$ | $d_2 =\ 8.6$ |
| $r_3 = +1140.0$ | $b_1 =\ 3.3$ |
| $r_4 = +\ 76.7$ | $b_2 = 211.0$ |
| $r_5 = +\ 111.0$ | $d_3 =\ 5.1$ |
| $r_6 = -\ 111.0$ | $d_4 =\ 15.75$ |
| $r_7 = -\ 772.2$ | $d_5 =\ 8.9$ |

Kinds of Glass.

| | nD. | nG'. |
|---|---|---|
| $L_1$: | 1.59133 | 1.60362 |
| $L_2$: | 1.62350 | 1.64457 |
| $L_3$: | 1.62105 | 1.63496 |
| $L_4$: | 1.61972 | 1.64224 |
| $L_5$: | 1.62105 | 1.63496 |

EXAMPLE FIG. 2.

Focal length of the total system 1052.7.

| Radii. | Thicknesses and Distances. |
|---|---|
| $r_4 = -\ 77.1$ | $b^1 =\ 17.9$ |
| $r_5 = +100.7$ | $b_2 = 197.7$ |
| $r_6 = -\ 89.6$ | $d_3 =\ 5.2$ |
| $r_7 = \pm\ \infty$ | $d_4 =\ 16.8$ |
| | $d_5 =\ 9.0$ |

Kinds of Glass.

| | nD. | nG'. |
|---|---|---|
| $L_3$: | 1.61569 | 1.62913 |
| $L_4$: | 1.57940 | 1.59891 |
| $L_5$: | 1.51410 | 1.52424 |

Figure 3:
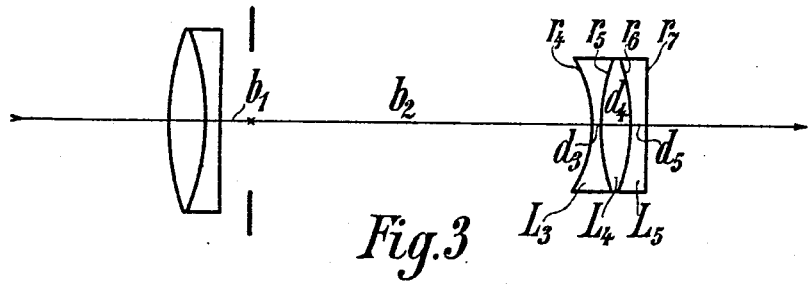

Example Fig. 3.

Focal length of the total system 903.6.

| Radii. | Thicknesses and Distances. |
|---|---|
| $r_4 = -70.0$ | $b_1 = 17.9$ |
| $r_5 = +112.0$ | $b_2 = 197.7$ |
| $r_6 = -112.0$ | $d_3 = 5.2$ |
| $r_7 = \pm \infty$ | $d_4 = 16.8$ |
| | $d_5 = 9.0$ |

*Kinds of Glass.*

| | nD. | nG'. |
|---|---|---|
| $L_3$: | 1.51410 | 1.52424 |
| $L_4$: | 1.57940 | 1.59891 |
| $L_5$: | 1.61569 | 1.62913 |

Figure 4:
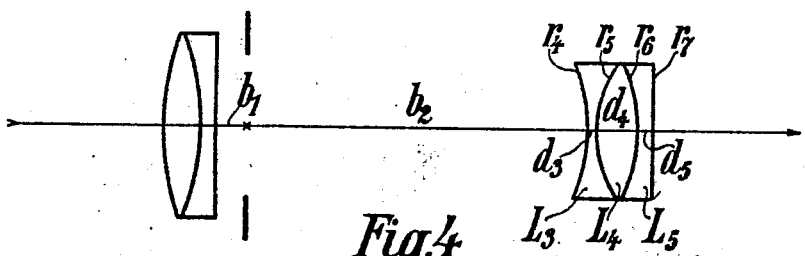

Example Fig. 4.

Focal length of the total system 905.9.

| Radii. | Thicknesses and Distances. |
|---|---|
| $r_4 = -97.4$ | $b_1 = 17.9$ |
| $r_5 = +67.2$ | $b_2 = 197.7$ |
| $r_6 = -89.6$ | $d_3 = 5.2$ |
| $r_7 = -1880.0$ | $d_4 = 23.5$ |
| | $d_5 = 9.0$ |

*Kinds of Glass.*

| | nD. | nG'. |
|---|---|---|
| $L_3$: | 1.61569 | 1.62913 |
| $L_4$: | 1.57305 | 1.59106 |
| $L_5$: | 1.61569 | 1.62913 |

I claim:

Chromatically and spherically corrected tele-objective consisting of a positive cemented double lens in front and a negative cemented triple lens behind, the focal length of the positive lens exceeding that of the negative one, the median part of the negative lens being collective and the other two parts of it dispersive, and each of both lenses being chromatically corrected, but having a spherical aberration of the order of magnitude and of the sign of a simple lens, which has the same focal length positive and negative respectively.

ERNST WANDERSLEB.

Witnesses:
PAUL KRÜGER,
FRITZ SANDER.